Figure 1:
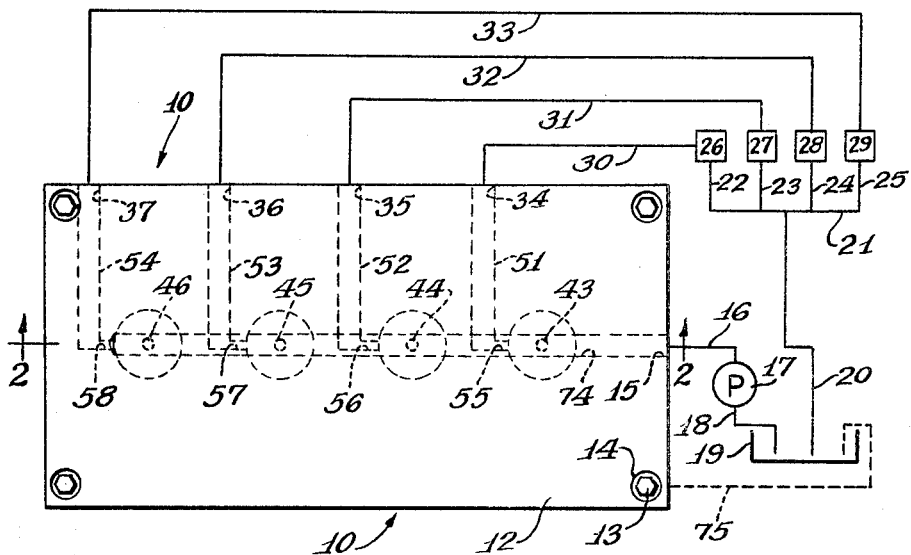
Figure 2:
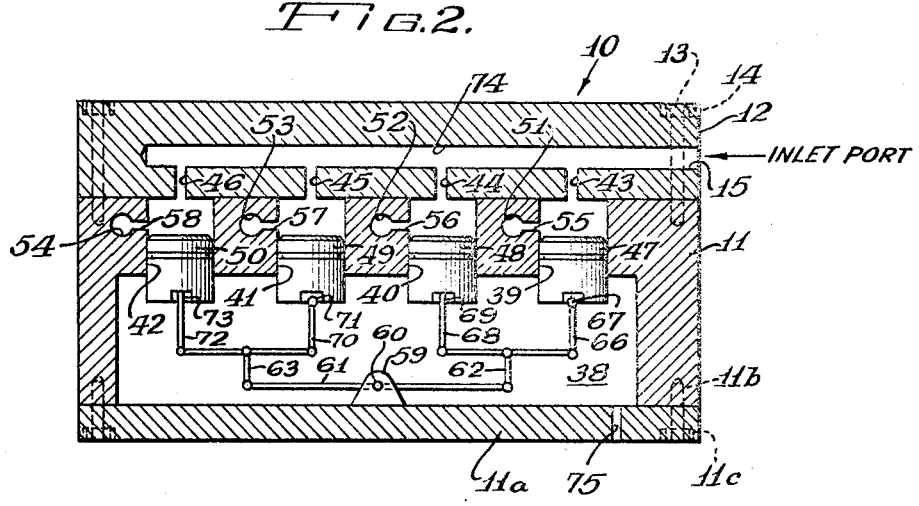

Oct. 11, 1966 R. J. W. C. STOW 3,277,917
PROPORTIONAL FLOW DIVIDERS
Filed Dec. 31, 1963 4 Sheets-Sheet 1

Inventor:
Robin J. W. C. Stow
By Walter L. Gregg
Atty.

Inventor:
Robin J. W. C. Stow

Oct. 11, 1966  R. J. W. C. STOW  3,277,917
PROPORTIONAL FLOW DIVIDERS
Filed Dec. 31, 1963  4 Sheets-Sheet 3

Inventor:
Robin J. W. C. Stow
By Walter F. Greavy
Atty.

Oct. 11, 1966    R. J. W. C. STOW    3,277,917
PROPORTIONAL FLOW DIVIDERS
Filed Dec. 31, 1963    4 Sheets-Sheet 4

Inventor:
Robin J. W. C. Stow
By Walter L. Greavy
Atty.

United States Patent Office 3,277,917

Patented Oct. 11, 1966

1

3,277,917
PROPORTIONAL FLOW DIVIDERS

Robin J. W. C. Stow, East Flamboro, Ontario, Canada, assignor to International Harvester Company, Chicago, Ill., a corporation of New Jersey Filed Dec. 31, 1963, Ser. No. 334,886
12 Claims. (Cl. 137—98)

This invention relates to improvements in fluid proportioning devices adaptable for use where it is desired to obtain a predetermined division of fluid, such for instance as hydraulic fluid, flowing from a common source of fluid under pressure to a plurality of conduit lines leading to respective hydraulically actuated devices.

More particularly, however, the invention is concerned with, and a primary object hereof is directed thereto, providing improvements in fluid proportioning devices of the type wherein a single liquid or gas flow is divided into separate flow circuits in desired relative proportions, regardless of differences of pressure between the separate flow circuits, or variations of pressure in any of said circuits.

Anohter object is to provide a fluid proportioning device which is continuously self-adjusting.

A further object is to provide a fluid proportioning device that is sufficiently flexible and adaptable to be utilized with hydraulic arrangements requiring a common supply source but varying numbers of outlets for fluid flow therefrom.

A more specific object is to provide a fluid proportioner utilizing reciprocable pistons in cylinders, one for each outlet thereof, and wherein balanced forces acting on said pistons operate to maintain a predetermined division of fluid flow therefrom.

A still further object is to provide a flow proportioning device wherein a variation in pressure in any one or more of the plurality of outlet circuits associated therewith becomes operative through force balancing means for effecting a balancing of forces in the remaining ones of said outlet circuits and thus maintaining the division or proportioning of flow desired.

A yet still further object is to provide an improved fluid proportioning device which, when interconnected between a common source of fluid pressure and a plurality of fluid actuated devices, is capable of accurately proportioning or metering fluid flow therethrough and which is also sufficiently compact and self-contained to be mounted in a small space.

The foregoing and other objects and advantages are attained by the present invention, various novel features of which will be apparent from the description herein and the accompanying drawings disclosing several embodiments of the invention, and will be more particularly pointed out in the appended claims.

FIGURE 1 is a top plan view of one preferred form of the proposed fluid proportioning device and includes a diagrammatic representation of a hydraulic circuit in which the device may be utilized;

FIGURE 2 is a vertical sectional view of the preferred form taken along the lines 2—2 of FIGURE 1;

FIGURE 3 is a top plan view similar to FIGURE 1 but showing one preferred modified form of the proposed device;

FIGURE 4 is a vertical sectional view of the modified form of FIGURE 3 and taken along the lines 4—4 of said figure;

FIGURE 5 is a vertical elevational view of another preferred modified form of the proposed invention including therewith a diagrammatic representation of the hydraulic circuit in which the device may be utilized;

FIGURE 6 is a horizontal sectional view of the pro-

2 posed modification of FIGURE 5 and taken along the lines 6—6 of said figure;

FIGURE 7 is a vertical elevational view similar to FIGURE 5 but showing another preferred modified form of the proposed invention; and FIGURE 8 is a horizontal sectional view of the proposed modification of FIGURE 7 and taken along the lines 8—8 of FIGURE 7.

Reference may be had now to FIGURES 1 and 2 where there is illustrated a preferred form of the proposed invention. The device, represented generally by the reference numeral 10, includes a casing or body 11, a cover or head member 12 detachably secured to the body by suitable means such as the fastening bolts 13, the heads of which may, if desired, be countersunk in said cover as seen at 14, and a bottom or base member **11*a* suitably secured by bolts 11*b* countersunk at 11*c*. An inlet port opening 15 in cover or head 12 is connected by a fluid-carrying conduit 16 to a fluid pressure source, such as the pump 17, which, it will be understood will be suitably driven by power means (not shown), and the intake of said pump is connected by a conduit 18 with a source of fluid such as reservoir 19. Said reservoir, in turn, is connected by a conduit 20 to a manifold like conduit 21 which has a plurality of branch conduits 22, 23, 24, and 25 extending therefrom and connected respectively to a plurality of work-producing hydraulic devices such as the hydraulic motors represented at 26, 27, 28, 29, and said motors are connected by conduits 30, 31, 32, 33 with respective outlet port openings 34, 35, 36, and 37 in the casing or body 11**.

The body 11 is fashioned with an interior recess that cooperates with the bottom or base **11*a* to provide a chamber 38. Said body also is provided with a plurality of bores 39, 40, 41, 42 arranged in parallel alignment with one another and which open at one of the ends thereof into respective orifice-like passages 43, 44, 45, 46 in cover 12 and at the other of the ends said bores open into chamber 38 and such bores, as so fashioned, function as cylinders for slidably receiving the respective pistons 47, 48, 49, 50. Outlet port openings 34, 35, 36, 37 are connected by transversely extending passages 51, 52, 53, 54 and outlet ports 55, 56, 57, 58 with respective cylinders 39, 40, 41, 42**.

A support 59 suitably affixed to one wall of chamber 38 provided by the base **11*a* pivotally supports at 60 a balancing lever 61 which at one end thereof has pivotally connected thereto a short vertical arm 62 and at its other end said balancing lever is pivotally connected to a similar short vertical arm 63. Arm 62 is pivotally connected at its opposite end to the mid-point of a lever 64 while arm 63 is pivotally connected to the mid-point of a lever 65. One end of lever 64 is pivotally connected to a vertical link 66 and the upper end of said link is pivotally connected at 67 to piston 47, and the opposite end of lever 64 is pivotally connected to a vertical link 68 the opposite end of which is rigidly affixed at 69 to piston 48. Similarly, one end of lever 65 is pivotally connected to a vertical link 70 while the upper end of said link is pivotally connected at 71 to piston 49, and the opposite end of lever 65 is pivotally connected to a vertical link 72 whose opposite end is rigidly connected at 73 to piston 50. The preceding interconnected linkage mechanism which includes support 59, balancing lever 61, arms 62, 63, levers 64, 65, and links 66, 68, 70 and 72** is actually a motion-transmitting means and may be termed a force balancing means or more specifically a mechanical force balancing mechanism as will be seen from subsequent elaboration. This force balancing means, as thus arranged and proportioned, functions so that a force on one piston produces an equal reaction at each of the other pistons, and downward motion or motion of a piston in one direction acting through said motion-transmitting means produces upward motion or motion in an opposite direction of one or all other pistons until forces are balanced.

Orifice-passages 43, 44, 45, 46 which provide a fixed restriction to flow are interconnected by an inlet manifold or common passage 74 the latter being closed at one end and opening at the other end thereof into port opening 15. If desired, a drain passage such as indicated at 75 may communicate the chamber 38 with the reservoir source of fluid 19 for purposes of continuously returning drainage or leakage fluid to said reservoir.

Normally the pistons 47, 48, 49, 50 are positioned so as to rest immediately below the openings of the respective outlet ports 55, 56, 57, 58 thereby allowing fluid under pressure, supplied by way of manifold conduit 74 and orifice passages 43, 44, 45, 46 to flow freely and be distributed equally to all cylinders and thereafter to the respective hydraulic devices. The orifice-like passages 43, 44, 45, 46, which are substantially identical in dimensions, produce a small pressure drop, with an equal portion of the flow through each, when the pressure in each of the outlet ports 55, 56, 57, 58 is equal. If the pressure rises in one of said outlet ports, such as 55, or flow is reduced therein, causing a reduction of pressure drop across the associated orifice-passage 43, the pressure in the associated cylinder 39 rises. The corresponding increased load on associated piston 47 in said cylinder forces it downwardly, as illustrated herein, and, by transfer of motion through the force balancing or motion-transmitting linkage means, causes the other pistons 48, 49, 50 to rise. As said latter pistons rise, they move over the respective outlet ports 56, 57, 58 and progressively reduce the flow of fluid out of the associated cylinders 40, 41, 42. The latter action, in turn, causes a rise of pressure in these latter cylinder until the pressure in all cylinders becomes the same. When this happens motion of the pistons stops and the pressure drop across each orifice-passage is equalized, and equal flow is again restored.

It will be appreciated that for equal flow the dimensions of the orifice-passages will be equal, however, if the proportions of flow to each of the hydraulic circuits are not required to be equal, but in some other required ratio, such can be accomplished by choice of appropriate orifice-passage dimensions. In general, the flow rate to said circuits is proportional to the area of the orifice-passage, since the pressure drop across each is equal under static or balanced conditions. It will also be understood that the area of the pistons must be maintained equal and the outlet ports must offer no appreciable restriction to flow when not obscured or covered by the respective pistons.

It will be readily appreciated that the present invention is not limited to the immediately above described force balancing or motion-transmitting mechanism but is susceptable of application with other forms of mechanisms that provide comparable means for balancing force and transmitting motion between the pistons. Accordingly, several other suitable means for accomplishing the motion-transmitting inventive concepts hereof will be described hereinafter. In the subsequent descriptions like elements will be designated with the same reference numerals plus the additional digits of 100, 200 or 300, respectively, for each subsequently modified mechanism.

Figure 3:
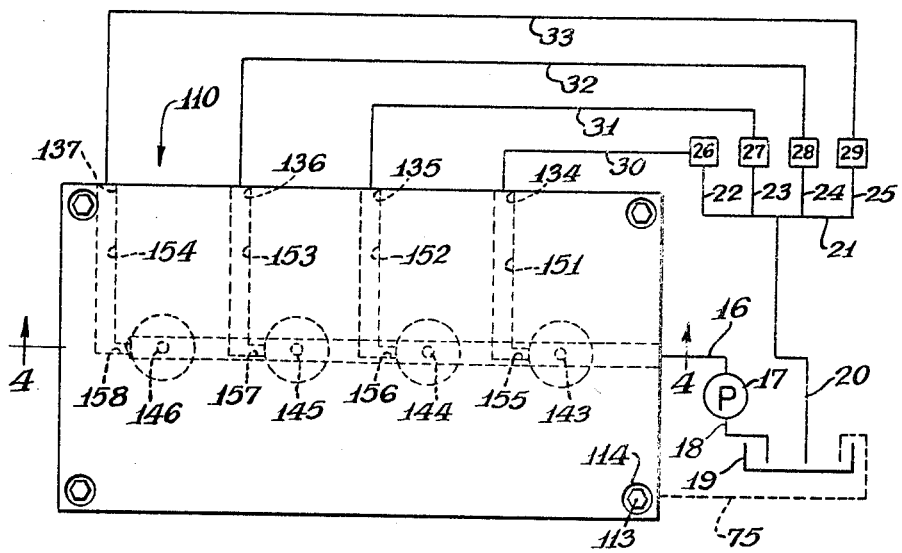
Figure 4:
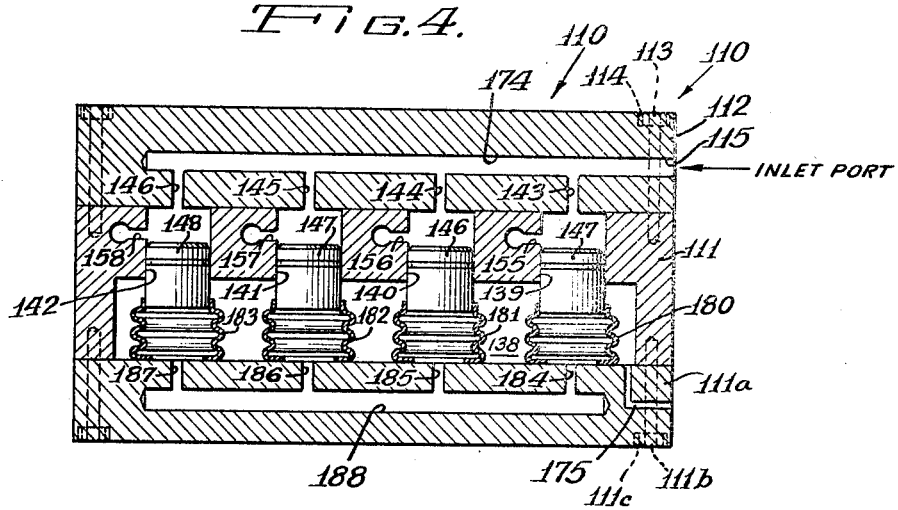

In FIGURES 3 and 4 there is illustrated a modified form of the present invention which employs hydraulic balancing or motion-transmitting means and which, although illustrated as being employed with four hydraulically actuated devices, is suitable or adaptable for use with almost any number of such hydraulically actuated devices. The proposed unit, represented generally by the numeral 110, includes, a body 111, a cover or head 112 held thereon by bolts 113 disposed in countersunk holes 114, and a bottom or base member 111a suitably affixed by bolts 111b mounted in countersunk openings 111c. The inlet conduit from the fluid pressure source connects into inlet port 115 while the outlet port openings 134, 135, 136, 137 are suitably communicatively connected to the respective hydraulically actuated devices. The body 111 is fashioned with an interior recess to provide chamber 138, while a plurality of parallelly arranged bores 139, 140, 141, 142 provide suitable cylinders therein. Orifice-passages 143, 144, 145, 146 in head 112 communicate said cylinders with a common inlet manifold or passage 174, while the outlet ports 155, 156, 157, 158 connect with the respective port openings 134, 135, 136, 137 by way of passages 151, 152, 153, 154. Pistons 147, 148, 149, 150 are mounted for slidable movement within the respective cylinders. The lower or outwardly projecting ends of the pistons are connected one each with the respective expandable and contractable bellows 80, 181, 182, 183 and the lower or bottom ends of said bellows are suitably affixed to one wall of the chamber 138 provided by the base portion 111a of said unit. Passages 184, 185, 186, 187 connect the respective bellows with an interconnecting passage 188 provided in said base portion. A suitable non-compressible fluid in the form of either liquid or gas will, of course, be provided in the bellows and in the closed interconnected circuit thereof, and the quantity of such fluid therein will be sufficient to maintain the pistons 147, 148, 149, 150 clear of their respective outlet port openings 155, 156, 157, 158 under normal operating conditions and thus permit free flow of fluid to the associated hydraulically actuated devices.

As heretofore explained, in connection with the first preferred embodiment, with the pistons 147, 148, 149, 150 normally positioned clear of the respective outlet ports 155, 156, 157, 158 fluid flows freely to the associated hydraulically actuated devices, but, if pressure rises in one of said outlet ports, such as 155, or flow is reduced therein so as to cause a reduction of the pressure drop across the associated orifice-passage 143, the pressure in the associated cylinder 139 rises. Now, the corresponding increased load on associated piston 147, resulting from said pressure rise, forces said piston downwardly, and by transfer of motion, by way of the hydraulic motion-transmitting and force balancing means encompassed within the passages 184, 185, 186, 187 interconnecting passage 188 and the respective bellows 180, 181, 182, 183, the remaining pistons 148, 149, 150 are caused to rise. Such rise in said latter pistons causes them to move over the respective outlet ports 156, 157, 158 and thereby progressively reduce the flow of fluid out of the respective cylinders 140, 141, 142. This latter action, in turn, causes a rise of pressure in these latter cylinders until the pressure in all cylinders becomes the same, whereupon motion of the pistons stops and the pressure drop across each orifice-passage becomes equalized, and equal flow is again restored.

Figure 5:
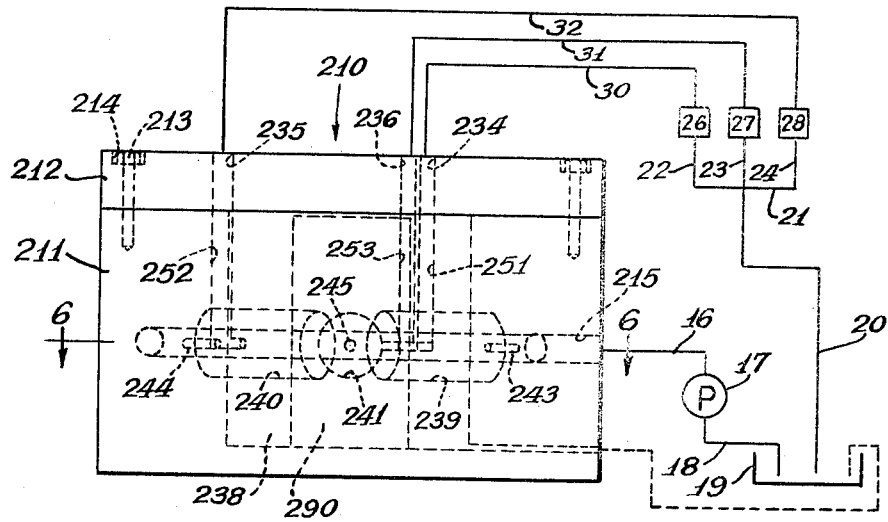
Figure 6:
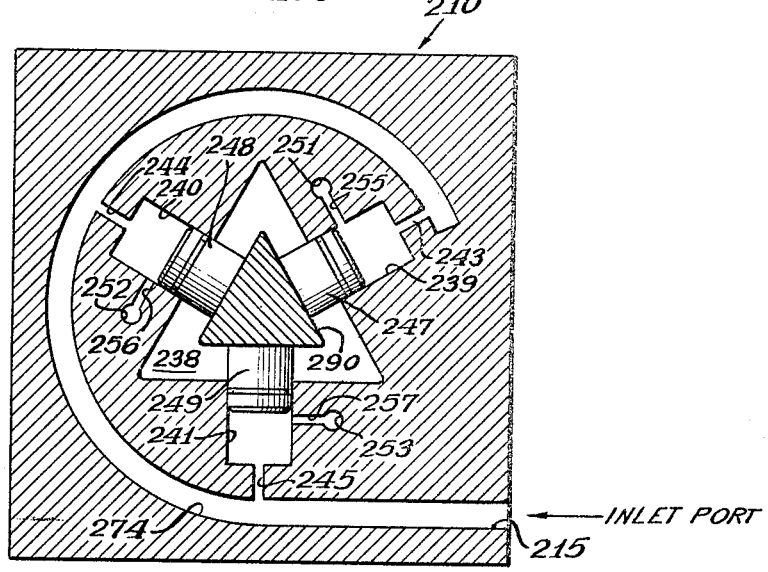

In FIGURES 5 and 6 there is illustrated another modification of the form of the present invention employing mechanical motion-transmitting or force balancing means, and which is particularly adaptable for employment with three hydraulically actuated devices. The modified device, depicted in FIGURES 5 and 6 and represented by the numeral 210, includes a body 211 and a cover or head 212 affixed to said body by bolts 213 disposed in countersunk holes 214. The inlet from the fluid pressure source connects into an inlet port 215 in said body, while the outlet port openings 234, 235, 236 therein are suitably communicatively connected to the respective hydraulically actuated devices. Body 211 is fashioned with an interior recess that forms the chamber 238 therein, while a plurality of bores 239, 240, 241 circularly arranged with the open ends thereof facing one another provide suitable cylinders therein. Orifice-passages 243, 244, 245, in body 211, communicate said cylinders with a common circularly extending inlet manifold or passage 274 that opens into inlet port 215 therein, while the outlet ports 255, 256, 257 connect with the respective port openings 234, 235, 236 by way of passages 251, 252, 253. Pistons 247, 248, 249 are mounted for slidable movement within the respective cylinders. A triangularly-shaped block 290 slidably rests on the bottom or floor of chamber 238 and extends upwardly therefrom to the interior surface of he head or cover 212 and the outwardly projecting ends of the pistons are disposed in abutting relation one each with a face of said block. Said block, which is shaped to resemble an equilateral triangle in cross-section is dimensioned so that when the pistons are in abutting relation therewith and the block is centrally disposed within chamber 238 the pistons will be clear of the respective outlet ports 255, 256, 257 so as to permit full fluid flow equally therethrough to the respective hydraulically actuated devices.

Now, when pressure rises in one of the outlet ports, such as 255, or flow is reduced therein this causes a reduction of the pressure drop across the respective orifice-passage 243 and a rise in pressure in the associated cylinder 239. The corresponding increased load on associated piston 247, resulting from said pressure rise, forces said piston outwardly toward chamber 238, and by transfer of motion, by way of the motion transmitting and force balancing means encompassing the slidable triangular block 290, the remaining pistons 248, 249 are caused to move inwardly into their respective cylinders. Such movements of said remaining pistons causes them to move over the respective outlet ports 256, 257, and thereby progressively reduce the flow of fluid out of the associated cylinders 240, 241. Said latter action, in turn, causes a rise of pressure in these latter cylinders until the pressure in all cylinders becomes the same, whereupon motion of the pistons stops and the pressure drop across each orifice-passage becomes equalized, and equal flow is again restored.

Figure 7:
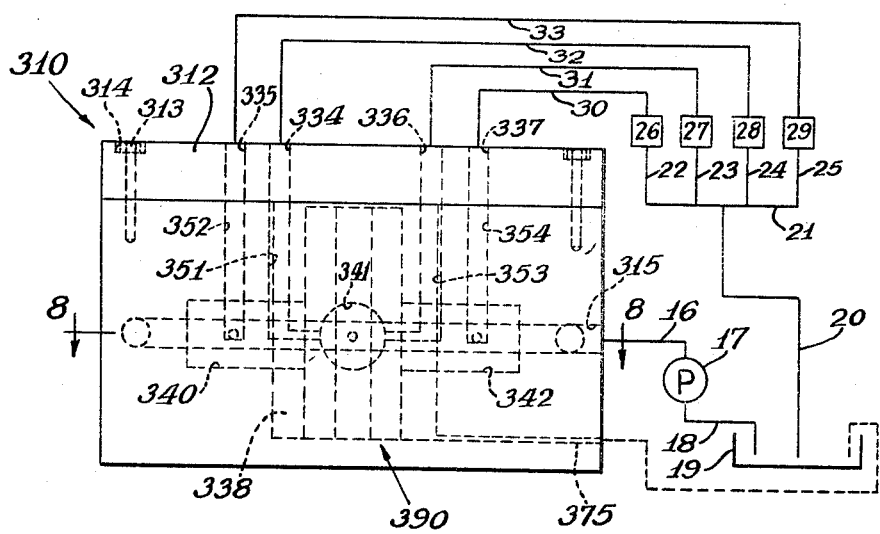
Figure 8:
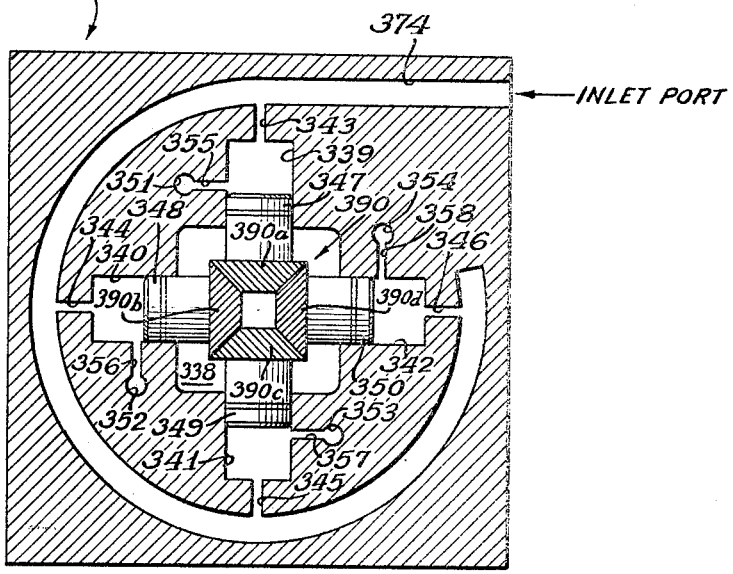

In FIGURES 7 and 8 there is illustrated an additional modification of the form of the invention that employs mechanical motion-transmitting or force balancing means. The instant modification is particularly adaptable for employment with four hydraulically actuated devices, and as depicted in FIGURES 7 and 8 is represented generally by the numeral 310. This form of the invention includes a body member 311, and a cover or head member 312 secured to said body by bolts 313 disposed in countersunk holes 314. The inlet from the fluid pressure source connects into an inlet port 315 in said body, while the outlet port openings 334, 335, 336, 337 therein are suitably communicatively connected to the respectively hydraulically actuated devices. Body 311 is fashioned with an interior recess that forms the chamber 338 therein, while a plurality of bores 339, 340, 341, 342 circularly arranged with the open ends thereof facing one another provide suitable cylinders therein. Orifice-passages 343, 344, 345, 346, in body 311, communicate with a circularly extending common inlet manifold or passage 374 that opens into inlet port 315 therein, while the outlet ports 355, 356, 357, 358 connect with the respective port openings 334, 335, 336, 337 by way of passages 351, 352, 353, 354. Pistons 347, 348, 349, 350 are mounted for slidable movement within the respective cylinders. A square-shaped hollow column or pedestal-like assembly, designated generally by the reference numeral 390, slidably rests on the bottom or floor of chamber 338 and extends upwardly therefrom to the interior surface of the head or cover 312 and the outwardly projecting ends of the pistons are disposed in abutting relation one each with an exterior face of said columnar assembly. Said latter assembly is fashioned from a plurality of four prism-like block members 390a, 390b, 390c, 390d, each of which has two opposite sides or faces cut at a 45° angle to the axes of the pistons, two parallel sides or faces normal to said axes, and the top and bottom ends which are parallel to one another and to said axes. These prism-like blocks are so dimensioned that when assembled they resemble a hollow square column, and when said assembly is centered in chamber 338 with the outwardly projecting ends of the pistons abutting the exterior faces thereof the inner ends of said pistons will be disposed clear of the respective port openings 355, 356, 357, 358, thus permitting full fluid flow equally from the fluid pressure source through the fluid proportioning unit to the respective hydraulically actuated devices. It will be readily seen that in assembling the prism members into the hollow block assembly the angularly cut faces of each prism member abuts an angularly cut face of an adjoining prism member thus forming the square hollow block illustrated.

With the prism blocks 390a, 390b, 390c, 390d assembled so that the proximate acutely angled faces abut one another, and since the contacting surfaces of said blocks are free to slide against one another as well as against their respective pistons, it will readily be seen that a force resulting from a piston pressing against one of the blocks will be distributed, by way of said motion-transmitting assembly, to each of the blocks and thus produces equal forces against the remaining three pistons. In this action the assembly will be somewhat distorted from the hollow square form of its centered position. In this manner said motion-transmitting assembly may be said to function as a force balancing means.

Now, when pressure rises in one of the outlet ports, such as 355, or flow is reduced therein this causes a reduction of the pressure drop across the respective orifice-passage 343 and a rise in pressure in the associated plunger 339. The corresponding increased load on associated piston 347, resulting from said pressure rise, forces said piston outwardly toward chamber 338, and by transfer of motion, by way of the motion-transmitting or force balancing means represented by the column-like assembly 390, the remaining pistons 348, 349, 350 are caused to move inwardly into their respective cylinders. Such movements of said remaining pistons causes them to move over the respective outlet ports 356, 357, 358, and thereby progressively reduces the flow of fluid out of the associated cylinders 340, 341, 342. Said latter action, in turn, causes a rise in pressure in these latter cylinders until the pressure in all cylinders becomes the same, whereupon motion of the pistons stops and the pressure drop across each orifice-passage becomes equalized and equal flow is again restored.

It should now be apparent that a novel fluid proportioning device has been shown and described, and it is to be understood that changes may be made in the construction without departing from the spirit of the invention or the scope thereof as defined in the appended claims.

What is claimed is:

1. In a hydraulic system having a source of fluid pressure and a plurality of work-producing hydraulically actuated devices, a fluid-proportioning device, comprising: a housing having a fluid inlet therein adapted for connection to said fluid pressure source, and a plurality of fluid outlets adapted for connection one each to one of said work-producing hydraulically acuated devices; said housing being fashioned to provide a chamber therein, and having a plurality of cylinders opening into said chamber, and having a piston reciprocally mounted in each of said cylinders; means in said housing providing a fluid passage between each of said cylinders and said inlet; means in said housing providing a plurality of fluid passages one each between a cylinder and an associated fluid outlet; motion-transmitting means disposed in part at least in said chamber and operatively associated with said pistons for transmitting motion therebetween; said latter means being operative responsive to reciprocal movement of any one of said pistons for translating said movement into a force for moving the remaining pistons a proportional amount for equalizing pressure within all said cylinders and thereby maintaining a predetermined division of fluid flow to all of said hydraulically actuated devices.

2. In a hydraulic system having a source of fluid pressure and a plurality of work-producing hydraulically actuated devices, a fluid-proportioning device, comprising: a housing having a fluid inlet therein adapted for connection to said fluid pressure source, and a plurality of fluid outlets adapted for connection one each to one of said work-producing hydraulically actuated devices; said housing being fashioned to provide a chamber therein, and having a plurality of cylinders opening into said chamber, and having a piston reciprocally mounted in each of said cylinders; means in said housing providing a fluid passage between each of said cylinders and said inlet; means in said housing providing a plurality of fluid passages one each between a cylinder and an associated fluid outlet; motion-transmitting means disposed in part at least in said chamber and operatively associated with said pistons for transmitting motion therebetween; said latter means being operative responsive to a variation in pressure within said cylinders for transmitting motion of the associated piston resulting from said variation in pressure into motion of the remaining pistons for equalizing pressure within all said cylinders and thereby maintaining a predetermined proportioning of fluid flow to all of said hydraulically actuated devices.

3. A fluid-proportioning device, comprising a housing having a fluid inlet therein adapted for connection to a fluid pressure source, and a plurality of fluid outlets adapted for connection one each to a hydraulically actuated device; said housing being fashioned to provide a chamber therein, and having a plurality of cylinders opening into said chamber, and having a piston reciprocally mounted in each of said cylinders with said pistons all being of the same area; means in said housing providing a fluid passage between each of said cylinders and said inlet, and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; motion-transmitting means disposed in part at least in said chamber and operatively associated with said pistons for transmitting motion therebetween; said latter means being so proportioned as to normally position said pistons relative to the outlets of said cylinders as to permit a predetermined division of flow through said cylinders to associated hydraulic devices, but being operative responsive to a variation in pressure drop in one of said orifices for translating movement of the associated piston resulting from said variation into proportional compensating movements of the other of said pistons whereby pressure within all said cylinders is equalized and a predetermined proportioning of flow to all associated hydraulic devices is maintained.

4. A fluid-proportioning device, comprising: a housing having a fluid inlet therein adapted for connection to a fluid pressure source, and a plurality of fluid outlets adapted for connection one each to a hydraulically actuated device; said housing being fashioned to provide a chamber therein, and having a plurality of cylinders opening into said chamber, and having a piston reciprocally mounted in each of said cylinders with said pistons all being of the same area; means in said housing providing a fluid passage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; movement-transmitting symmetrically arranged mechanical linkage means with a mid-point thereof pivotally mounted within said chamber and operatively interconnecting said pistons for transmitting movement therebetween; said latter means being so proportioned and arranged as to normally position said pistons relative to the outlets of said cylinders as to permit a predetermined division of flow through said cylinders to associated hydraulic devices, but being operative responsive to a variation in pressure drop in one of said orifice for translating movement of the associated piston resulting from said variation into proportional compensating movements of the others of said pistons whereby pressure within all said cylinders is equalized and a predetermined proportioning of flow to all associated hydraulic devices is maintained.

5. The structure described in claim 4 and further characterized in that said cylinders are parallelly arranged with the axes thereof in one longitudinally extending plane and having the movement-transmitting linkage means also all disposed in the same one plane.

6. A fluid-proportioning device, comprising a housing having a fluid inlet therein adapted for connection to a fluid pressure source, and a plurality of fluid outlets adapted for connection one each to a hydraulically actuated device; said housing being fashioned to provide a chamber therein, and having a plurality of parallelly arranged cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; movement-transmitting linkage means pivotally mounted within said chamber and operatively interconnecting said pistons for transmitting movement therebetween; said linkage means including arms connected to said pistons with certain ones of said arms being pivotally connected and certain other ones of said arms being rigidly connected to the respective pistons; said movement-transmitting linkage means being so proportioned and arranged as to normally position said pistons relative to the outlets of said cylinders as to permit a predetermined division of fluid flow through said cylinders to associated fluid outlets, but being operative responsive to a variation in pressure drop in one of said orifices for translating movement of the associated piston resulting from said variation into proportional movements of the others of said pistons whereby pressure within all said cylinders is equalized and a predetermined division of flow to all associated hydraulic devices is maintained.

7. A fluid-proportioning device, comprising: a housing having a fluid inlet therein adapted for connection to a fluid pressure source, and a plurality of fluid outlets adapted for connection one each to a hydraulically actuated device; said housing being fashioned to provide a chamber therein, and having a plurality of parallelly arranged cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; movement-transmitting hydraulic means disposed in part in said chamber and part in said housing and operatively associated with said pistons for transmitting movement therebetween; said latter means being so proportioned and arranged as to normally position said pistons relative to the outlets of said cylinders as to permit a predetermined division of flow through said cylinders to associated hydraulic devices, but being operative responsive to a variation in pressure drop in one of said orifices for translating movement of the associated piston resulting from said variation into proportional compensating movements of the others of said piston whereby pressure within all said cylinders is equalized and a predetermined proportioning of flow to all associated hydraulic devices is maintained.

8. A fluid-proportioning device, comprising: a housing having a fluid inlet therein adapted for connection to a fluid pressure source, and a plurality of fluid outlets adapted for connection one each to a hydraulically actuated device; said housing being fashioned to provide a chamber therein, and having a plurality of parallelly arranged cylinders with one end of each opening into said chamber, and having a piston reciprocally mounted in each of said cylinders with said pistons all being of the same cross-sectional area; means in said housing providing a fluid passaage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; hydraulic movement-transmitting means disposed in part in said chamber and in said housing and operatively combined with said pistons for transmitting movement therebetween; said latter means including a plurality of expandable and contractible bellows each of which is connected at one end to a piston and at the other end to one wall of said chamber, means forming a passage in said housing communicatively interconnecting one end of each of said bellows, and a supply of non-compressible fluid filling each of said bellows and said latter passage; said movement-transmitting means being proportioned and arranged as to normally position said pistons relative to the outlets of said cylinders as to permit a predetermined division of fluid flow through said cylinders to associated fluid outlets, but being operative responsive to a variation in pressure drop in one of said orifices for translating movement of the associated piston resulting from said variation into proportional movements of the others of said pistons whereby pressure within all said cylinders is equalized and a predetermined division of flow to all associated hydraulic devices is maintained.

9. A fluid-proportioning device comprising: a housing having a fluid inlet therein adapted for connection to a fluid pressure source, and a plurality of fluid outlets adapted for connection one each to a hydraulically actuated device; said housing being fashioned to provide a chamber therein, and having three circumferentially arranged and equally spaced-apart cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each of said passage whereby a drop in pressure is introduced in pressure fluid flowing through the respective passages; means in said housing providing a plurality of outlet fluid passages one each between a cylinder and an associated one of said fluid outlets; movement-transmitting means disposed for slidable movement within said chamber and positioned in a slidably engageable relation with each of said pistons for transmitting movement therebetween; said latter means being so proportioned and arranged as to normally position said pistons relative to the outlets of said cylinders as to permit a predetermined division of flow through said cylinders to associated hydraulic devices, but being operative responsive to a variation in pressure drop in one of said orifices for translating movement of the associated piston resulting from said variation into proportinal compensating movements of the others of said pistons whereby pressure within all said cylinders is equalized and a predetermined proportioning of flow to all associated hydraulic devices is maintained.

10. A fluid-proportioning device comprising: a housing having a fluid inlet therein adapted for connection to a fluid pressure source, and a plurality of fluid outlets adapted for connection one each to a hydraulically actuated device; said housing being fashioned to provide a chamber therein, and having three circumferentially arranged and equally spaced-apart cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; movement-transmitting means disposed for slidable movement within said chamber and positioned for slidably abutting relationship with each of said pistons for transmitting movement therebetween; said latter means including a three-sided member equilaterally shaped in cross-section and having parallel opposite ends and disposed with the equilateral sides thereof each abutting a respective piston; said movement-transmitting means being so proportioned and arranged that when said member is centered in said chamber said pistons are positioned relative to the outlets of said cylinders as to permit a predetermined division of flow through said cylinders to associated hydraulic devices, but being operative responsive to a variation in pressure drop in one of said orifices for translating movement of the associated piston resulting from said variation into proportional compensating movements of the others of said pistons whereby pressure within all said cylinders is equalized and a predetermined proportioning of flow to all associated hydraulic devices is maintained.

11. A fluid-proportioning device comprising: a housing having a fluid inlet therein adapted for connection to a fluid pressure source, and a plurality of fluid outlets adapted for connection one each to a hydraulically actuated device; said housing being fashioned to provide a chamber therein, and having four circumferentially arranged and equally spaced-apart cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each said passage whereby a drop in pressure is introduced in pressure fluid flowing through the respective passages; means in said housing providing a plurality of outlet fluid passages one each between a cylinder and an associated one of said fluid outlets; movement-transmitting means disposed for slidable movement within said chamber and positioned in a slidably engageable relation with each of said pistons for transmitting movement therebetween; said latter means being so proportioned and arranged as to normally position said pistons relative to the outlets of said cylinders as to permit a predetermined division of flow through said cylinders to associated hydraulic devices, but being operative responsive to a variation in pressure drop in one of said orifices for translating movement of the associated piston resulting from said variation into proportional compensating movements of the others of said pistons whereby pressure within all said cylinders is equalized and a predetermined proportioning of flow to all associated hydraulic devices is maintained.

12. A fluid-proportioning device comprising: a housing having a fluid inlet therein adapted for connection to a fluid pressure source, and a plurality of fluid outlets adapted for connection one each to a hydraulically actuated device; said housing being fashioned to provide a chamber therein, and having four circumferentially arranged and equally spaced-apart cylinders with one end of each opening into said chamber, and having a piston reciprocally mounted in each of said cylinders with said pistons all being of the same cross-sectional area; means in said housing providing a fluid passage between each of said cylinders and said inlet and having an orifice providing a fixed restriction to fluid flow in each said passage whereby a drop in pressure in introduced in pressure fluid flowing through the respective passages; means in said housing providing a plurality of outlet fluid passages one each between a cylinder and an associated one of said fluid outlets; movement-transmitting means disposed for slidable movement within said chamber and positioned in a slidably engageable relation with each of said pistons for transmitting movement therebetween; said latter means including four prism blocks arranged to provide in an assembled relationship a hollow square column assembly having four side faces and two end faces with each of said side faces abuttingly engaging a respective piston; each of said prism blocks being fashioned with two opposite side faces cut at a 45° angle to the axes of the pistons, two parallel faces normal to the axes of the pistons and two end faces which are parallel to one another and to the axes of the pistons; said movement transmitting means being so proportioned and arranged that when said assembly is centered in said chamber said pistons are positioned relative to the outlets of said cylinders as to permit a predetermined division of flow through said cylinders to associated hydraulic devices, but being operative responsive to a variation in pressure drop in one of said orifices for translating movement of the associated piston resulting from said variation into proportional compensating movements of the others of said pistons whereby pressure within all said cylinders is equalized and a predetermined proportioning of flow to all associated hydraulic devices is maintained.

References Cited by the Examiner
UNITED STATES PATENTS 2,622,610   12/1962   Rowe et al. _____ 137—100
3,223,040   12/1965   Dinkelkamp _____ 60—97 X WILLIAM F. O'DEA, *Primary Examiner.*

D. ZOBKIW, *Examiner.*